Sept. 29, 1953  W. A. LINQUIST  2,653,649
WHEEL CHAIR WITH DETACHABLE ARMREST
Filed Feb 11, 1950  2 Sheets-Sheet 2
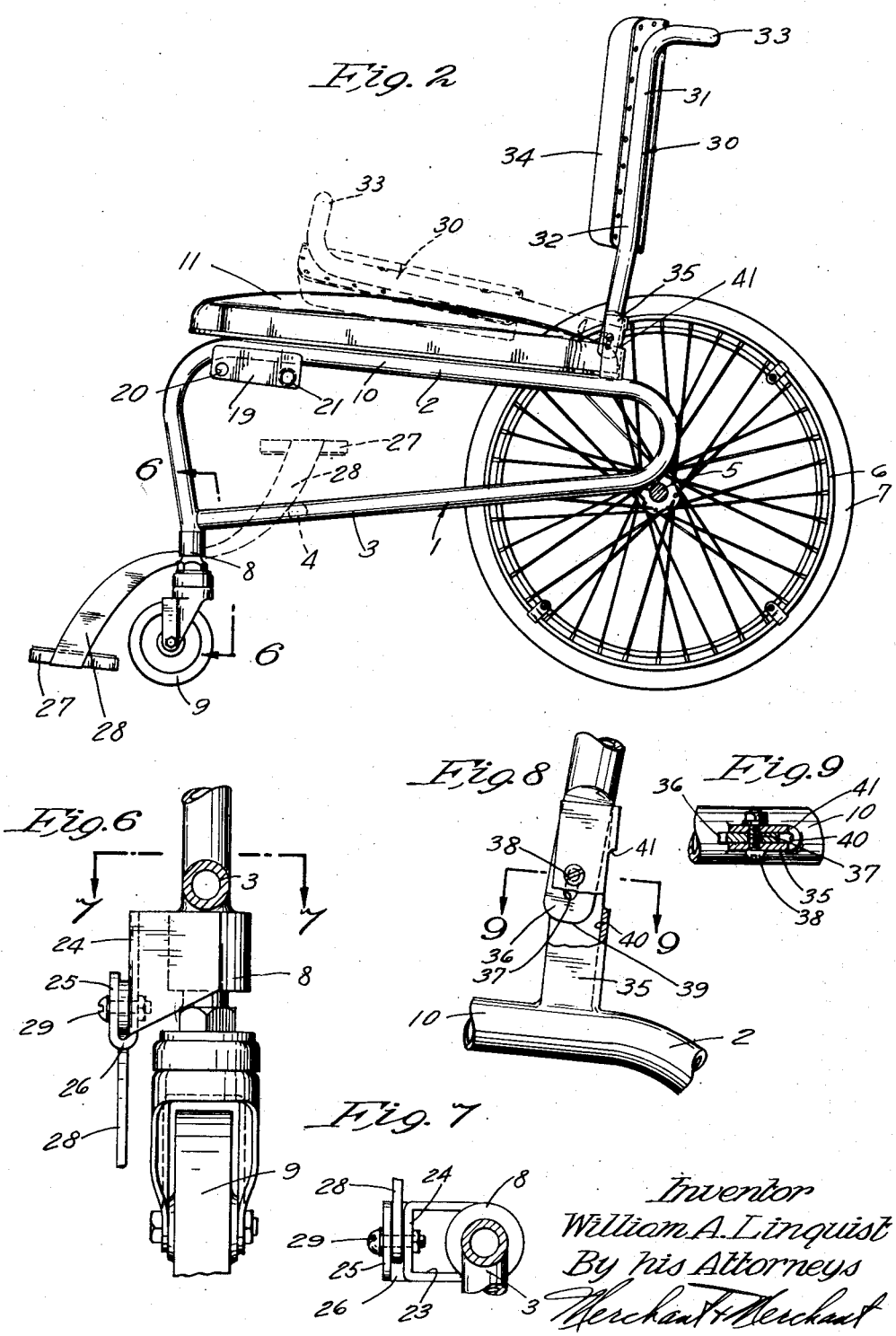
Inventor
William A. Linquist
By his Attorneys
Merchant & Merchant Patented Sept. 29, 1953

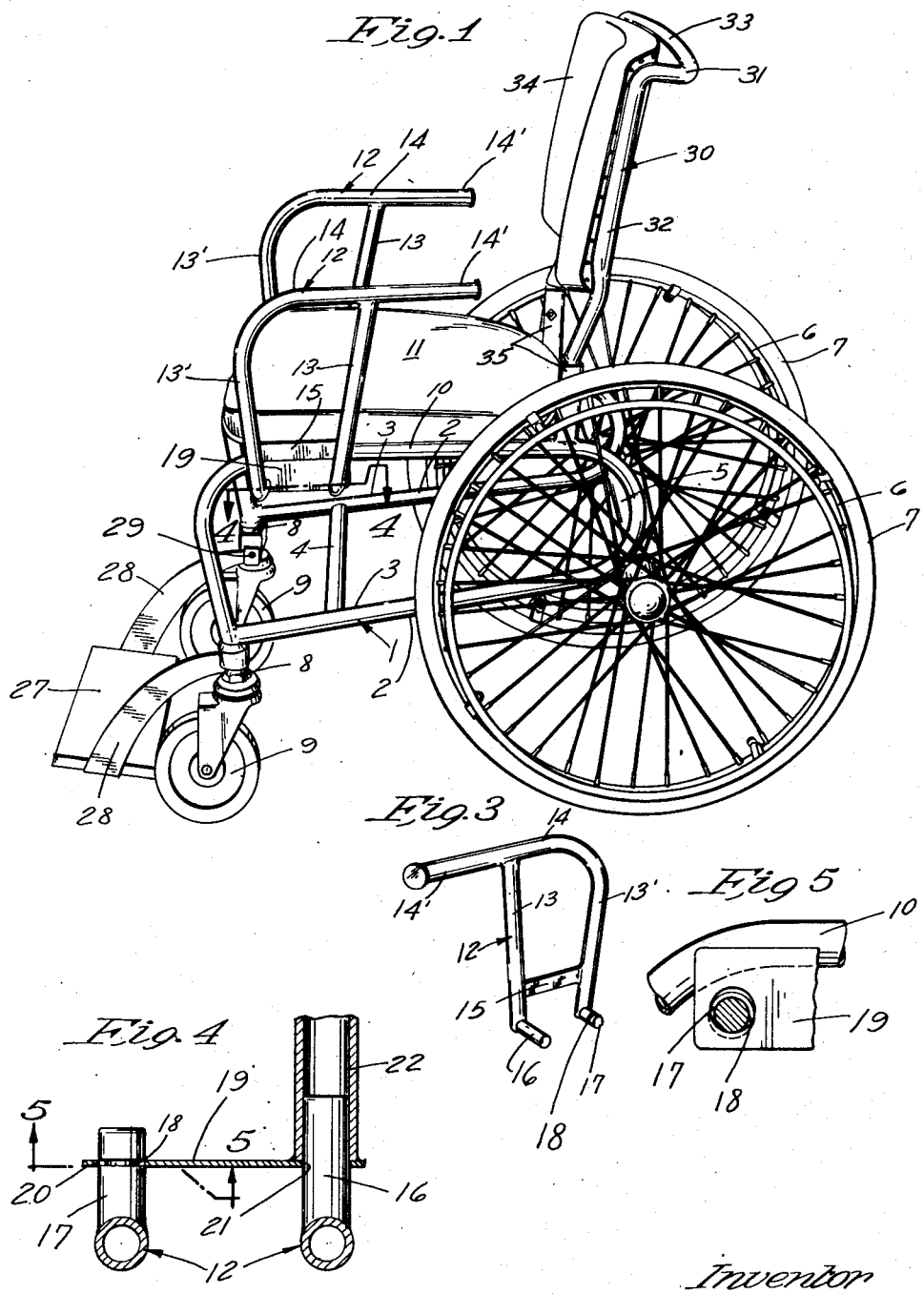

2,653,649

UNITED STATES PATENT OFFICE 2,653,649

WHEEL CHAIR WITH DETACHABLE ARMREST

William A. Linquist, Minneapolis, Minn.

Application February 11, 1950, Serial No. 143,616

2 Claims. (Cl. 155—30)

My invention relates to improvements in portable invalids' chairs or wheel chairs.

The primary object of my invention is the provision of a device of the class described, in which the seat is so located with respect to the large hand-propelled drive wheels, that approach of the seat can be made from the side as well as the front.

A still further object of my invention is the provision of novel side frame elements, which may be readily attached and detached, to further facilitate approach to the seat from the side.

A still further object of my invention is the provision of novel means for locking said side frame elements against accidental displacement.

A still further object of my invention is the provision of a novel extensible and retractible foot-supporting platform, used in conjunction with the device of the class described.

A still further object of my invention is the provision of novel mounting means for the back rest-forming element of my invention, whereby the same may be folded forwardly on the seat.

A still further object of my invention is the provision of novel means for locking the back rest-forming element in its operative position.

The above and still further objects of my invention will become apparent from the following detailed specification, appended claims, and attached drawings.

Referring to the drawings, wherein like characters indicate like parts throughout the several views:

Fig. 1 is a perspective view of my novel device;

Fig. 2 is a view in side elevation, some parts being broken away and some parts being shown in section;

Fig. 3 is a perspective view of one of the detached side frame elements of my novel structure;

Fig. 4 is an enlarged fragmentary section taken on the line 4—4 of Fig. 1;

Fig. 5 is a fragmentary section taken on the line 5—5 of Fig. 4;

Fig. 6 is an enlarged fragmentary section taken substantially on the line 6—6 of Fig. 2;

Fig. 7 is a view partly in section and partly in plan, taken on the line 7—7 of Fig. 6;

Fig. 8 is an enlarged fragmentary view in side elevation of the hinge connection between the back-supporting frame and the main frame; and Fig. 9 is a view in section taken on the line 9—9 of Fig. 8.

Referring with greater particularity to the drawings, the numeral 1 indicates, in its entirety, a main frame made up of laterally-spaced vertically-disposed generally rectangular members 2, preferably formed from tubular steel or the like. The lower horizontal bar 3 of each of the members 2 is connected by a transverse reinforcing brace member 4 in spaced relation to the forward ends thereof and by a transverse axial member 5 adjacent the rear ends. The opposite ends of the axial member 5 project laterally outwardly of the members 2 and have rotatably mounted thereon a large drive wheel 6 preferably equipped with a rubber tire 7. Stub legs 8, depending from the forward ends of the bottom bars 3 of frame members 2, are equipped with caster wheels 9. Mounted on the main frame 1 and spanning the upper bars 10 of the frame members 2 is a seat 11 which is spaced forwardly sufficiently with respect to the drive wheel 6 to allow access thereto, either from the side or the front.

A pair of detachable side frame elements, identified in their entireties by the numeral 12, are made up of a pair of generally vertically-disposed laterally-spaced members 13 and 13' and a generally horizontally-disposed arm rest-forming member 14, which connects the upper ends of the members 13. A transverse member 15 connects the members 13 adjacent to their lower ends. It will be observed that the arm rest member 14 projects considerably rearwardly of the members 13, as indicated at 14'. Members 13, 13', and 14 are also preferably formed from steel tubing or the like. Projecting laterally-inwardly in opposed relationship from the lower ends of the members 13 and 13' are pairs of mounting pins 16 and 17 respectively, the former of which, preferably and as shown, are of greater length than the pins 17. However, the pins 17 are provided, intermediate their ends, with circumferentially-extended radially outwardly-opening channels 18, for a purpose which will hereinafter become apparent.

Depending from and rigidly carried by the upper bar 10 of the frame members 2 are plate-like side frame-mounting elements 19, which are provided with laterally-spaced apertures 20 and 21. As shown, the mounting plates 19 are secured by welding or the like to the outer side edges of the members 10 adjacent their front ends, the apertures 20 and 21 respectively being spaced below the members 10. Secured to the opposed side faces of the plates 19 are tubular bearing sleeves 22 which are aligned with the apertures 21 and are of the same diameter thereas. The bearings 22 are adapted to snugly receive for pivotal movements therein one each of the mounting pins 16, The apertures 20 are adapted to slidably receive the mounting pins 17. However, as the pins 16 and 17 are moved inwardly through the apertures 20 and 21 respectively, the circumferentially-extended channel 18, which is of a width only slightly greater than the thickness of the plate 19, becomes vertically aligned with said plate 19. At this point of alignment, the pin 17 drops downwardly, under the action of gravity, and a portion of the plate 19 is received within said channel, as indicated specifically in Fig. 5. This engagement between a portion of the side frame-mounting plate 19 and the channel 18 locks the side frame elements 12 against lateral movements with respect to the main frame 1. Removal of the side frame elements 12 can be effected only by re-alignment of the axes of the pins 17 with the apertures 20. Thus, by this novel arrangement, the pins 16 and cooperating bearing sleeves 22 maintain the side frame elements 12 in vertical position; while engagement between the channels 18 and the portions of the mounting plate 19 immediately adjacent the apertures 20 locks the side frame elements 12 against accidental lateral displacement.

Welded or otherwise secured to the stub legs 8 in opposed relationship are U-shaped anchoring brackets, preferably formed from sheet steel or the like. Preferably and as shown, the opposed inner ends 24 of the brackets 23 have integrally-formed lower portions which are bent backwardly in parallel spaced relationship to provide upwardly-opening U-shaped bearing brackets 25, the closed bottoms of which are identified by the numeral 26. A foot-supporting platform 27, shown as being rectangular in form, is provided at its opposite ends with angularly-disposed arms 28, the projected ends of which are receivable within the U-shaped bearing brackets 25 and are pivotally mounted therein by nut-equipped bolts 29. Engagement of the arms 28 with the closed bottom ends 26 of the bearing brackets 25 limits forward movement of the arms 28 and the foot-supporting platform 27 to the position shown by full lines in Fig. 2; whereas rearward motion of the platform 27 and arms 28 is limited by engagement of the intermediate portion of the arms 28 with the transverse brace member 4.

A back-supporting element, identified in its entirety by the numeral 30, preferably and as shown, includes a generally inverted U-shaped frame member 31, the depending legs of which are identified by the numeral 32 and the transverse upper connecting member by the numeral 33. A suitable pad 34 is shown as being connected at its opposite side edges to the leg members 32; whereas the transverse member 33 is rearwardly offset from the legs 32 and the pad 34 to facilitate grasping.

Rigidly secured by welding or the like to the upper horizontal bars 10 of the main frame 2, adjacent their rear ends, are upstanding forwardly-opening generally U-shaped hinge brackets 35 into which the flattened lower ends 36 of the depending legs 32 are loosely received. It will be noted that said flattened portions 36 of the legs 32 are provided with longitudinally-extending slots 37 through which, for longitudinal sliding movements, pass aligned hinge pins 38, which extend transversely through the hinge brackets 35. It will be noted that the slots 37 are so positioned with respect to the bottom edges 39 of the legs 32 that, when the hinge pins 38 are allowed to pass under the action of gravity to the upper limits of movement within the slots 37, the legs 32 will be locked against forward pivotal movements by virtue of abutment of the end 36 with the closed rear wall 40 of the hinge brackets 35 (see particularly Fig. 8). On the other hand, when the back-supporting element 30 is lifted so as to position the hinge pins 38 in the lower limits of the slots 37, the radius of the then-depending portion of the flattened ends 36 of the legs 32 is sufficiently small to permit folding of the back-supporting member 30 to the dotted line position of Fig. 2, without the bottom edge portion 39 of the flattened ends 36 coming into contact with the rear wall 40 of the hinge brackets 35. Preferably and as shown, this folding action is here facilitated by notching away the rear walls 40, as indicated by the numeral 41.

My novel structure, while adequately strong to accommodate even an extremely heavy person, may be readily reduced in size, so as to facilitate storage or transportation in a small space, by removal of the side frame elements 12 in the manner above described and by folding of the back-supporting element 30 and the foot-supporting platform 27 to the dotted line positions of Fig. 2.

It is frequently highly desirable to slide an indisposed or crippled person sideways from a bed or stationary chair to the wheel chair. This may be readily accomplished with my novel structure by removal of one or both of the side frame members 12. When this has been done, the patient may be placed upon the seat 11 from the side without the possibility of coming into contact with the drive wheels 6, because said wheels have been placed so far rearwardly with respect to the seat.

My invention has been thoroughly tested and found to be completely satisfactory for the accomplishment of the above objectives; and, while I have shown a commercial form of the invention, it should be obvious that the same is capable of modification without departure from the spirit of the invention as defined in the appended claims.

What I claim is:

1. In a device of the class described, a wheel-mounted main frame, a seat mounted on said main frame, a side frame element provided at its lower end with a pair of horizontally-disposed laterally inwardly-projecting mounting pins, a side frame mounting element carried by said main frame and having a pair of laterally-spaced apertures capable of receiving therein one each of said mounting pins, an elongated bearing element on said mounting element and aligned with the rearward of said apertures and pivotally receiving therein the rearward of said mounting pins, the forward of said mounting pins being provided intermediate its ends with a circumferentially-extended radially outwardly-opening channel of a width to snugly receive therein a portion of said side frame-mounting element upon pivotal movements of the rearward of said mounting pins in said bearing, reception of said mounting element in said channel limiting horizontal movement of said mounting pins and said side frame member with respect to said main frame.

2. The structure defined in claim 1 in which said side frame element comprises a pair of generally vertically-disposed bars one each projecting upwardly from and rigidly connected to one of said mounting pins, and a generally horizontally-disposed arm rest member connecting the upper ends of said bars and extending rearwardly thereof.

WILLIAM A. LINQUIST.

References Cited in the file of this patent

UNITED STATES PATENTS

| Number | Name | Date |
|---|---|---|
| 597,665 | Andren | Jan. 18, 1898 |
| 1,420,924 | Hogan | June 27, 1922 |
| 1,995,739 | Friesner | Mar. 26, 1935 |
| 2,203,320 | Anderson | June 4, 1940 |
| 2,236,983 | Yusek | Apr. 1, 1941 |
| 2,269,918 | Sill | Jan. 13, 1942 |
| 2,356,077 | Mount | Aug. 15, 1944 |
| 2,382,953 | Baxter | Aug. 21, 1945 |
| 2,503,733 | Heller | Apr. 11, 1950 |
| 2,520,309 | Everest | Aug. 29, 1950 |